Jan. 27, 1931.  J. R. GAMMETER  1,790,210
METHOD AND APPARATUS FOR MANUFACTURING PNEUMATIC TIRES
Filed Aug. 2, 1928  3 Sheets-Sheet 1

INVENTOR.
JOHN R. GAMMETER.
BY Ely & Barrow
ATTORNEYS.

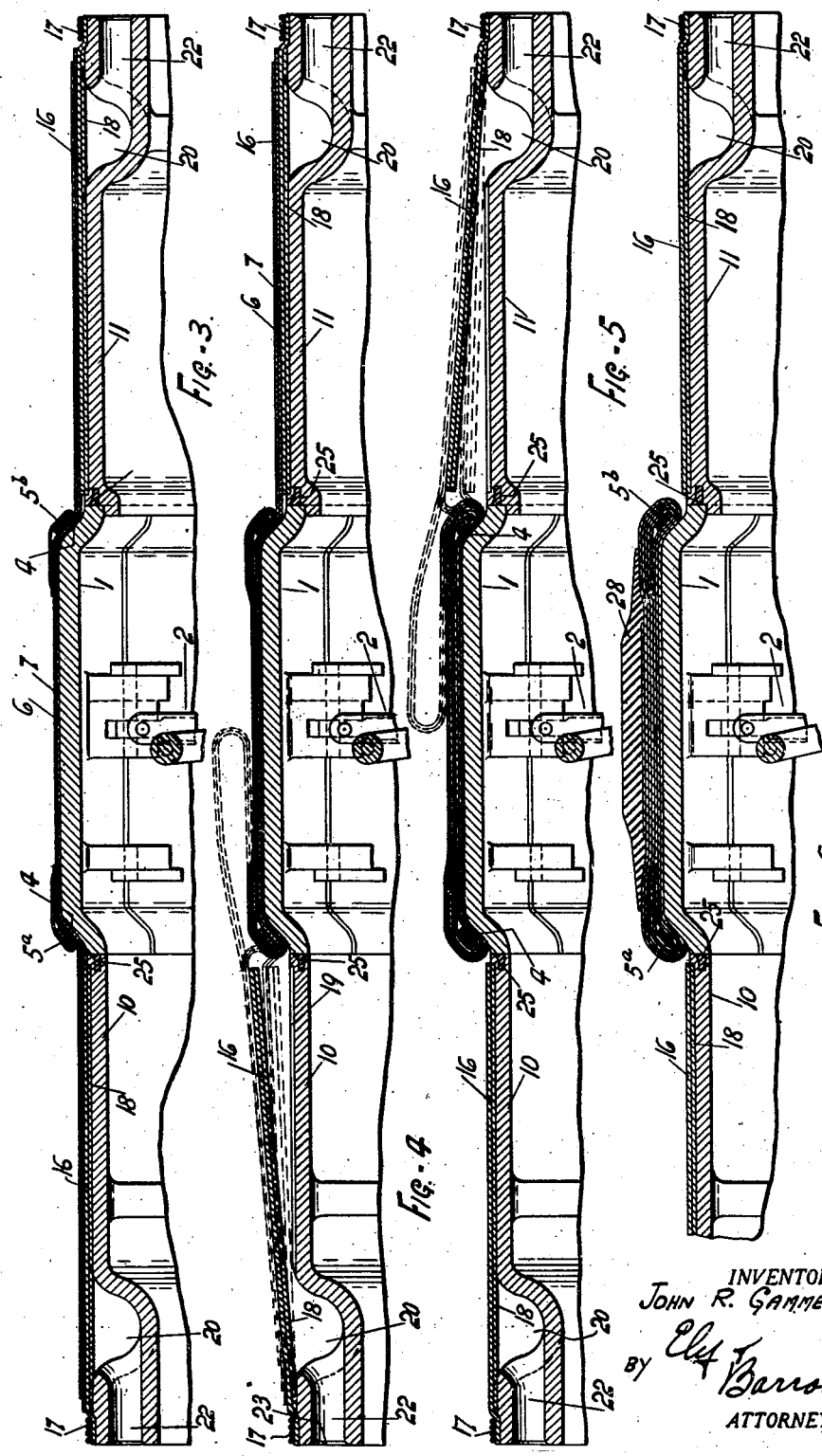

Jan. 27, 1931.  J. R. GAMMETER  1,790,210
METHOD AND APPARATUS FOR MANUFACTURING PNEUMATIC TIRES
Filed Aug. 2, 1928   3 Sheets-Sheet 3

INVENTOR.
JOHN R. GAMMETER
BY
Ely H Barrow
ATTORNEYS.

Patented Jan. 27, 1931

1,790,210

UNITED STATES PATENT OFFICE

JOHN R. GAMMETER, OF AKRON, OHIO

METHOD AND APPARATUS FOR MANUFACTURING PNEUMATIC TIRES

Application filed August 2, 1928. Serial No. 296,931.

The present invention relates to procedure and an apparatus for the manufacture of pneumatic vehicle tires and particularly to procedure and an apparatus for quickly, economically and satisfactorily making such tires by the so-called "flat band" methods.

The object of the present invention is to devise a procedure and an apparatus for building up the multiple ply band which constitutes the carcass structure of the tire by a process similar to that covered in my prior pending application Serial No. 267,505, filed April 5, 1928.

The apparatus forming the subject matter hereof relates to improved procedure and an improved organization by means of which the fabric plies are assembled in superposed relationship to form the carcass. The details of the invention are fully set forth in the drawing and in the description, but it will be understood that details may be altered or modified within the scope of the invention without departing from the essential features thereof.

In the drawings:

Figures 3, 4, 5 and 6 are detail sections of a portion of the apparatus showing the various successive steps in the process of manufacturing the tire;

Figure 1:
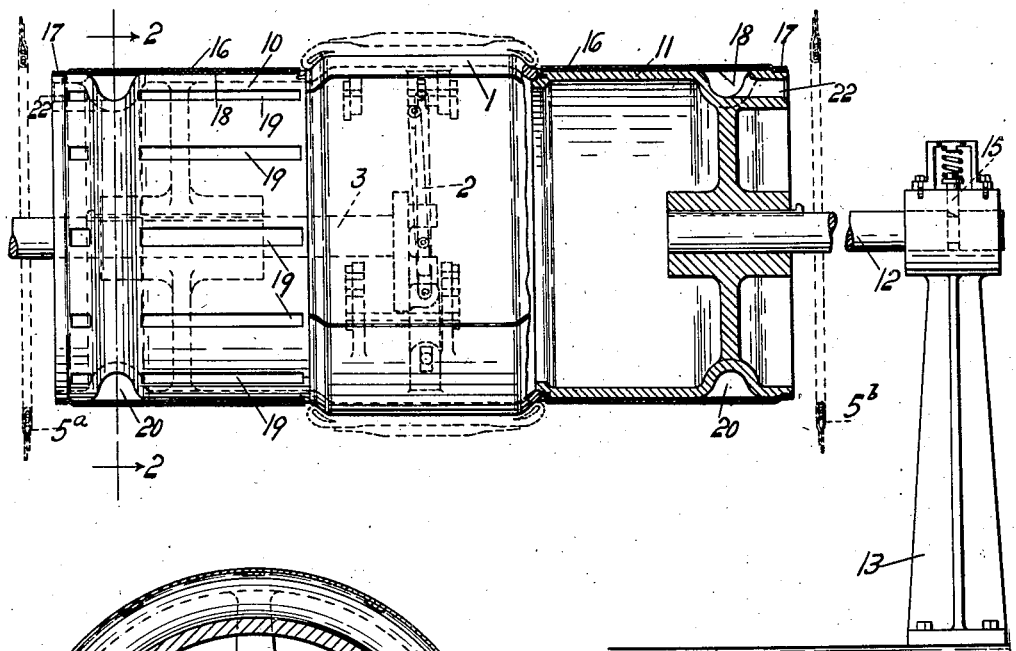
Figure 1 is a view showing a complete unit or organization of devices for practising the present invention, the view being in side elevation, with parts thereof in section.
Figure 2:
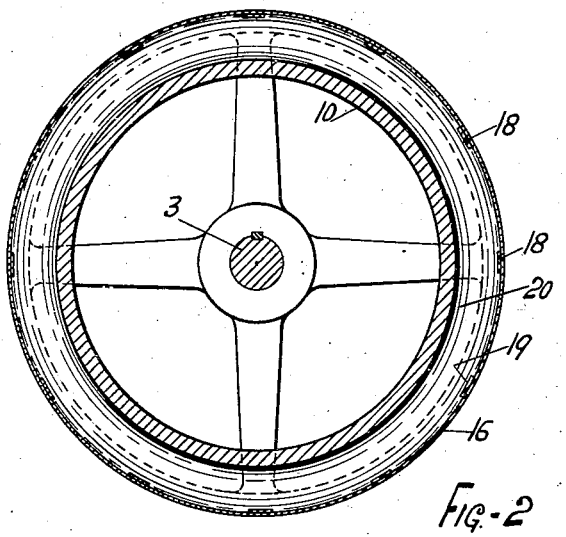
Figure 2 is a section thereof on the line 2—2 of Figure 1.
Figure 7:
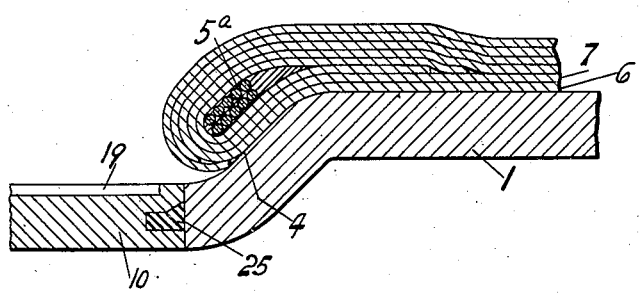
Figure 7 is an enlarged detail of the tire construction at the bead.
Figure 8:
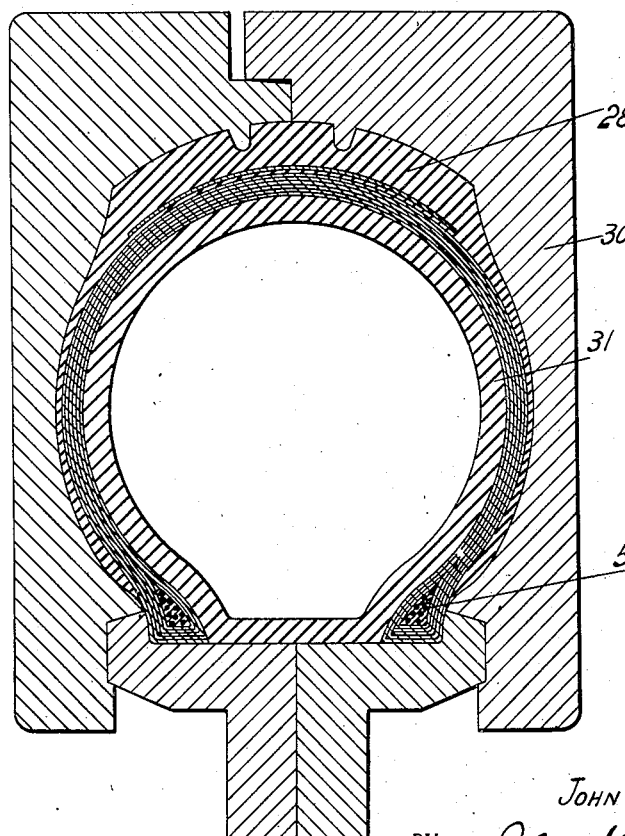
Figure 8 is a view of the completed tire carcass in the mold in which it is cured.

A method of manufacturing the pneumatic tire in fully set forth in my previous application referred to above, but in order to fully explain the principles of the present invention, a brief description thereof will be given.

The tire, which is built in accordance with the general principles of the flat band construction, is manufactured upon a collapsible tire building form 1 which may be provided with any suitable or standard collapsing mechanism 2 so that the drum can be contracted for the easy removal of a completed carcass. The drum is supported upon the projecting end of a shaft 3, by which it may be rotated by power if desired. As illustrated, the tire is shown as of the straight side or inextensible bead variety and for this purpose may have inwardly sloping or inclined edges 4 for the reception of the tire beads 5, which have incorporated therein a plurality of wires compounded with rubber and surrounded and enclosed by a layer or layers of fabric. As shown, the main surface of the drum is cylindrical, but this may be arched or crowned as found desirable. The details of the construction of the tire may be varied in accordance with the established practises or of special ideas of construction of the tire builder, such details not affecting the principles of the invention.

The tire, as shown, is a six-ply tire which is, in reality, manufactured from two layers or bands of fabric 6 and 7 superposed upon one another as shown. These bands may be of the same width, or of unequal widths, and may be stepped off from one another in any preferred manner. The bands are of approximately three times the width of the main pulley or tire building drum 1 and are laid over the drum with the central line of the fabric substantially coinciding with the central plane of the drum and with the edges or skirts of the fabric layers extending on opposite sides of the drum to form wings at either side thereof.

The wings or skirts of the fabric are preferably supported by drums 10 and 11 located at either side of the main tire building drum and in abutting relation thereto, so that they form substantially continuations of the surface of the main drum. The drum 10 is keyed directly to the shaft 3 and remains in its position at all times. The drum 11 is slidably mounted in relation to the drum 1 so that it can be removed from the drum to permit removal of the finished tire carcass. For this purpose a shaft 12 is provided, carried upon an upright 13 located at one side of the apparatus and spaced at such a distance that when the drum 11 and its shaft 12 are moved to the right, as shown in Figure 1, sufficient clearance will be had between the main drum and the supplemental drum to permit of removal of the tire. The shaft 12 is held in its outermost position during the building operation by a spring pressed pin or key 15. Except for these differences in mounting, the two drums are similar.

Each of the drums is covered with a layer or sheath of fabric 16 which is treated so as to be impervious to air. For this purpose stockinet or other woven or knitted fabric may be employed which may be given a light coating or impregnation of rubber. The fabric is slightly stretchable and is preferably provided with a smooth or non-adhesive surface so that the tire material will readily slip over the cover. This sheath of fabric is permanently attached about the outer edge of the drum by any suitable means, a wrapping or binding of cord or wire 17 being shown for this purpose. The balance of the sheath is free and unattached and extends to a point closely adjacent the edge of the main drum 1. The fabric sheath is preferably stiffened, to prevent wrinkling or bellying in the use of the apparatus, by a series of spaced straps or ribs of steel or whalebone 18. These reinforcing ribs are received within groove 19 cut in the surface of the drum.

Near its outer edge, each drum is provided with a circular trough or groove 20 which underlies the fabric sheath and is provided with an inlet 22, the mouth of which is beveled or recessed to receive and make fit with the end of an air nozzle (not shown) by which compressed air can be admitted to the groove and underneath the fabric sheath. The end of the drum abutting the main building drum is provided with a sealing gasket 25 so as to provide an air tight joint at this point.

The operation of building a tire upon the apparatus will now be described.

If continuous beads are to be employed, the bead 5ᵃ to the left may be passed over the drum 10 when the drum is collapsed to the position shown in dotted lines in Figure 1; the drum 10 being slightly smaller in diameter than the interior diameter of the bead. The bead 5ᵇ to the right is also passed over the drum 11 to the dotted line position. The drums 1, 10 and 11 are then assembled end to end, as shown, and the layers of fabric 6 and 7 are wrapped about the drums as shown. This fabric is usually of the cord type, cut upon a bias angle, as is well known in the art. The beads are then applied. In the form shown, the beads 5ᵃ and 5ᵇ are moved over from their dotted line position to positions against the surfaces 4. If clincher tires are to be made, the surfaces 4 may be omitted and the beads assembled from strips of material.

Air under pressure is then introduced beneath the sheaths on the drums 10 and 11. In the successive steps shown in Figures 3 and 6, air is first applied to the drum 10. As the air under pressure is admitted beneath the sheath, it will raise the inner end of the sheath and the entrapped air will buoy out the wing of fabric and cause it to turn over the beads, as shown in dotted lines. The force of the air will blow the fabric over completely until the edge of the fabric reaches the opposite bead. Air is then applied to the drum 11 and the opposite wing or skirt of fabric is blown over from the opposite direction. The overlying plies may then be rolled in position and the tread 28 and other finished elements added. The usual chafer strips are not shown as they may be omitted or added to the carcass at any convenient place, preferably by being laid over the edges of the drum as the first or preparatory step.

The drum 11 is then removed, the drum 1 collapsed and the tire in completed condition may then be removed for vulcanization. This is usually done in the mold 30 and upon an air bag or expansible core 31.

It will be understood that modifications and alterations may be made in details of the construction, but the essential features of the apparatus may be preserved. The use of compressed air to turn the plies of fabric over the beads and apply them to form the laminated pulley band is believed to be a radical departure from anything previously attempted in this art and results in a very economical and efficient apparatus for the manufacture of pneumatic tire casings. The principles of the invention may be carried out with one drum if, for example, a tire having a single fold of tire fabric is to be manufactured.

What is claimed is:

1. An apparatus for the manufacture of tire casings, comprising a main building form, a drum at one side of the form adapted to receive an outwardly projecting skirt of fabric from the main form, and means to admit air under pressure beneath the skirt.

2. An apparatus for the manufacture of tire casings, comprising a main building form, a drum at one side of the form adapted to receive an outwardly projecting skirt of fabric from the main form, and means to admit a blast of compressed air and to direct the air toward the main form whereby the skirt of fabric will be turned upon itself in the said form.

3. An apparatus for the manufacture of tire casings, comprising a main building form, a bead seat at the edge of the form, a drum contacting the edge of the form, and means to direct a blast of air beneath a layer of fabric covering the main form and the drum to cause the fabric to turn upon itself and the skirt to fold over upon the main form.

4. An apparatus for the manufacture of tire casings, comprising a main building form having an inwardly extending bead seat near the outer edge of the form, a drum having a diameter less than the principal diameter of the form, the outer surfaces of the drum and form being adapted to receive a layer of fabric, and means for admitting a blast of air under pressure beneath the fabric on the drum.

5. An apparatus for the manufacture of tire casings, comprising a main building form having an inwardly extending bead seat near the outer edge of the form, a drum having a diameter less than the principal diameter of the form, the outer surfaces of the drum and form being adapted to receive a layer of fabric, means for admitting a blast of air under pressure beneath the fabric on the drum, and means for directing the air toward the bead seat.

6. An apparatus for the manufacture of tire casings, comprising a main building form having an inwardly extending bead seat near the outer edge of the form, a drum having a diameter less than the principal diameter of the form, the outer surfaces of the drum and form being adapted to receive a layer of fabric, means for admitting a blast of air under pressure beneath the fabric on the drum, and a flexible sheath over the drum which is open toward the form.

7. An apparatus for the manufacture of tire casings, comprising a main building form having an inwardly extending bead seat near the outer edge of the form, a drum having a diameter less than the principal diameter of the form, the outer surfaces of the drum and form being adapted to receive a layer of fabric, means for admitting a blast of air under pressure beneath the fabric on the drum, and an air seal between the edges of the form and the drum.

8. An apparatus for the manufacture of tire casings, comprising a main building form having an inwardly extending bead seat near the outer edge of the form, a drum having a diameter less than the principal diameter of the form, the outer surface of the drum and form being adapted to receive a layer of fabric, means for admitting a blast of air under pressure beneath the fabric on the drum, means for directing the air toward the bead seat, and an air seal between the edges of the form and the drum.

9. An apparatus for the manufacture of tire casings, comprising a main building form having an inwardly extending bead seat near the outer edge of the form, a drum having a diameter less than the principal diameter of the form, the outer surfaces of the drum and form being adapted to receive a layer of fabric, means for admitting a blast of air under pressure beneath the fabric on the drum, a flexible sheath over the drum which is open toward the form, and an air seal between the edges of the form and the drum.

10. An apparatus for the manufacture of tire casings, comprising a main building form having an inwardly extending bead seat near the outer edge of the form, a drum having a diameter less than the principal diameter of the form, the outer surfaces of the drum and form being adapted to receive a layer of fabric, means for admitting a blast of air under pressure beneath the fabric on the drum, and a flexible sheath over the drum which is open toward the form, said sheath comprising a layer of fabric and semi-flexible stiffening members associated therewith.

11. In an apparatus for building tires, a main tire building form, a drum located alongside of said form, a sheath of fabric over the drum, said sheath being secured along the edge of the drum remote from the form, a channel on the face of the drum, and means for admitting air under pressure to the channel.

12. In an apparatus for building tires, a main tire building form, a drum located alongside of said form, a sheath of fabric over the drum, said sheath being secured along the edge of the drum remote from the form and a plurality of longitudinal stiffening members secured to the sheath, a channel on the face of the drum, and means for admitting air under pressure to the channel.

13. In an apparatus for building tires, a tire building form, two drums on either side of the form, said form and drums being adapted to receive a layer of fabric, a mounting for one of the drums by which it can be removed laterally therefrom, and means associated with the said drum to turn the fabric over and fold it against the surface of the form.

14. In an apparatus for building tires, a tire building form, bead sets on the edge of the form, two drums on either side of the form, said form and drums being adapted to receive a layer of fabric, a mounting for one of the drums by which it can be removed laterally therefrom, and means associated with said drums to elevate the fabric therefrom and to turn it over beads on the bead seats.

15. In an apparatus for building tires, a tire building form, two drums on either side of the form, said form and drums being adapted to receive a layer of fabric, a mounting for one of the drums by which it can be removed laterally therefrom, and means associated with the said drums to turn the fabric over and fold it against the surface of the form, said means comprising a passage on the surface of the drum adapted to direct a blast of air against the inner surface of the fabric.

16. In an apparatus for building tires, a tire building form, bead seats on the edge of the form, two drums on either side of the form, said form and drums being adapted to receive a layer of fabric, a mounting for one of the drums by which it can be removed laterally therefrom, and means associated with said drums to elevate the fabric therefrom and to turn it over beads on the bead seats, said means comprising a passage on the surface of the drum and means to direct a blast of air receivable in the passage in the direction of the bead seats.

17. Apparatus for building tires by the flat band method, comprising a form on which the ply or plies of material are laid with the beads of the tire positioned thereon, and means for supplying and maintaining air under pressure under an edge of the ply or plies to fold the ply or plies about a bead of the tire.

18. That method for making tires, comprising applying a ply or plies of tire material to a building form, positioning the beads on said plies to leave a wing or wings of the material extending beyond the bead or beads, raising the wing or wings off the surface of the drum, and folding the wing or wings over the bead or beads by air directed under the wing or wings to adjacent the bead or beads.

19. That method for making tires which comprises forming a band of tire material on a drum with the beads positioned thereon to leave a wing or wings of the material on the drum extending beyond the beads, and blowing said wing or wings from the drum surface over the bead or beads of the tire to fold said wing or wings about the beads by air directed under the wings adjacent the beads.

JOHN R. GAMMETER.